No. 817,209. PATENTED APR. 10, 1906.
H. A. WILLIAMS.
MACHINE FOR MAKING PIPES.
APPLICATION FILED FEB. 24, 1904. RENEWED APR. 21, 1905.

5 SHEETS—SHEET 1.

Witnesses
Chas. K. Davis.
M. E. Moore.

Inventor
Harry A. Williams
by Wm. A. Moore
Attorney.

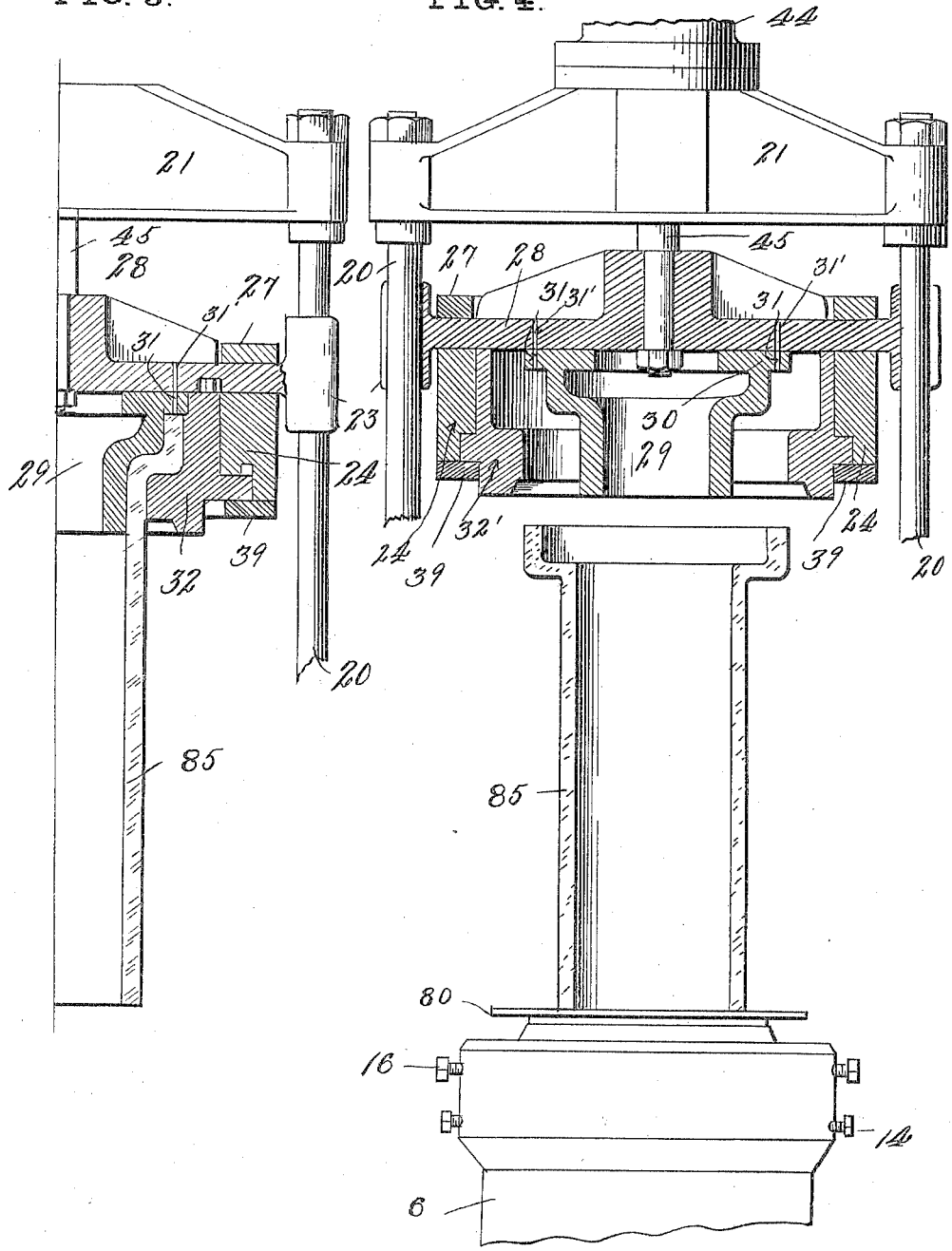

No. 817,209. PATENTED APR. 10, 1906.
H. A. WILLIAMS.
MACHINE FOR MAKING PIPES.
APPLICATION FILED FEB. 24, 1904. RENEWED APR. 21, 1905.
5 SHEETS—SHEET 3.
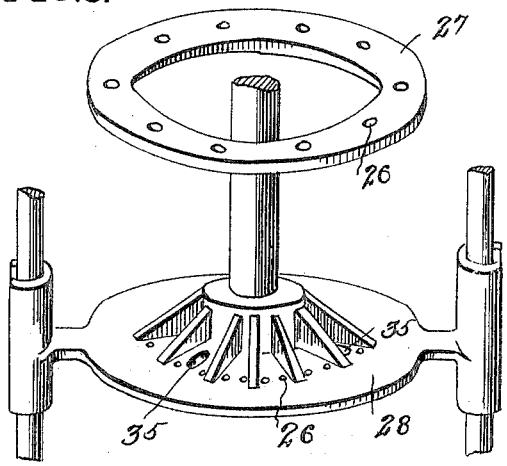
FIG. 5.
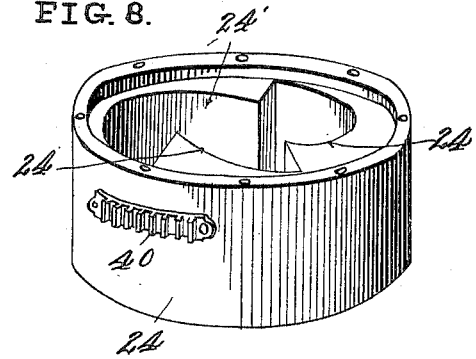
FIG. 8.
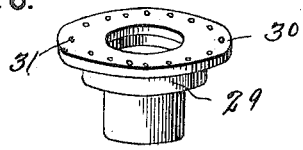
FIG. 6.
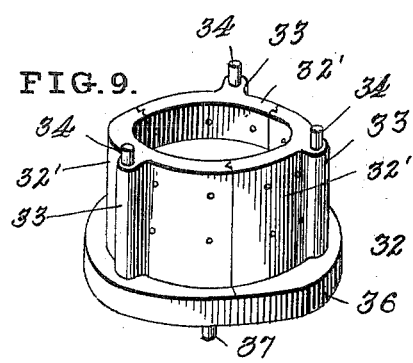
FIG. 9.
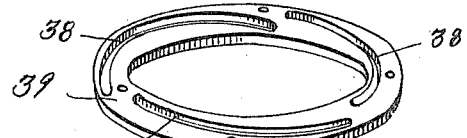
FIG. 10.
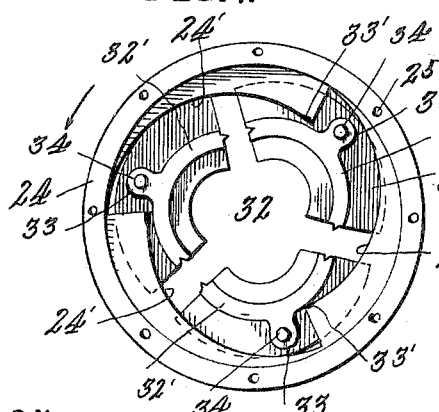
FIG. 7.
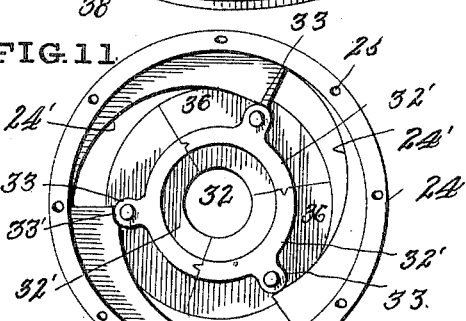
FIG. 11.
Witnesses
Chas. K. Davis.
M. E. Moore
Inventor
Harry A. Williams.
by
Attorney.

No. 817,209. PATENTED APR. 10, 1906.
H. A. WILLIAMS.
MACHINE FOR MAKING PIPES.
APPLICATION FILED FEB. 24, 1904. RENEWED APR. 21, 1905.

5 SHEETS—SHEET 4.

Witnesses
Chas. K. Davis.
M. E. Moore.

Harry A. Williams, Inventor
by Wm. A. Moore, Attorney

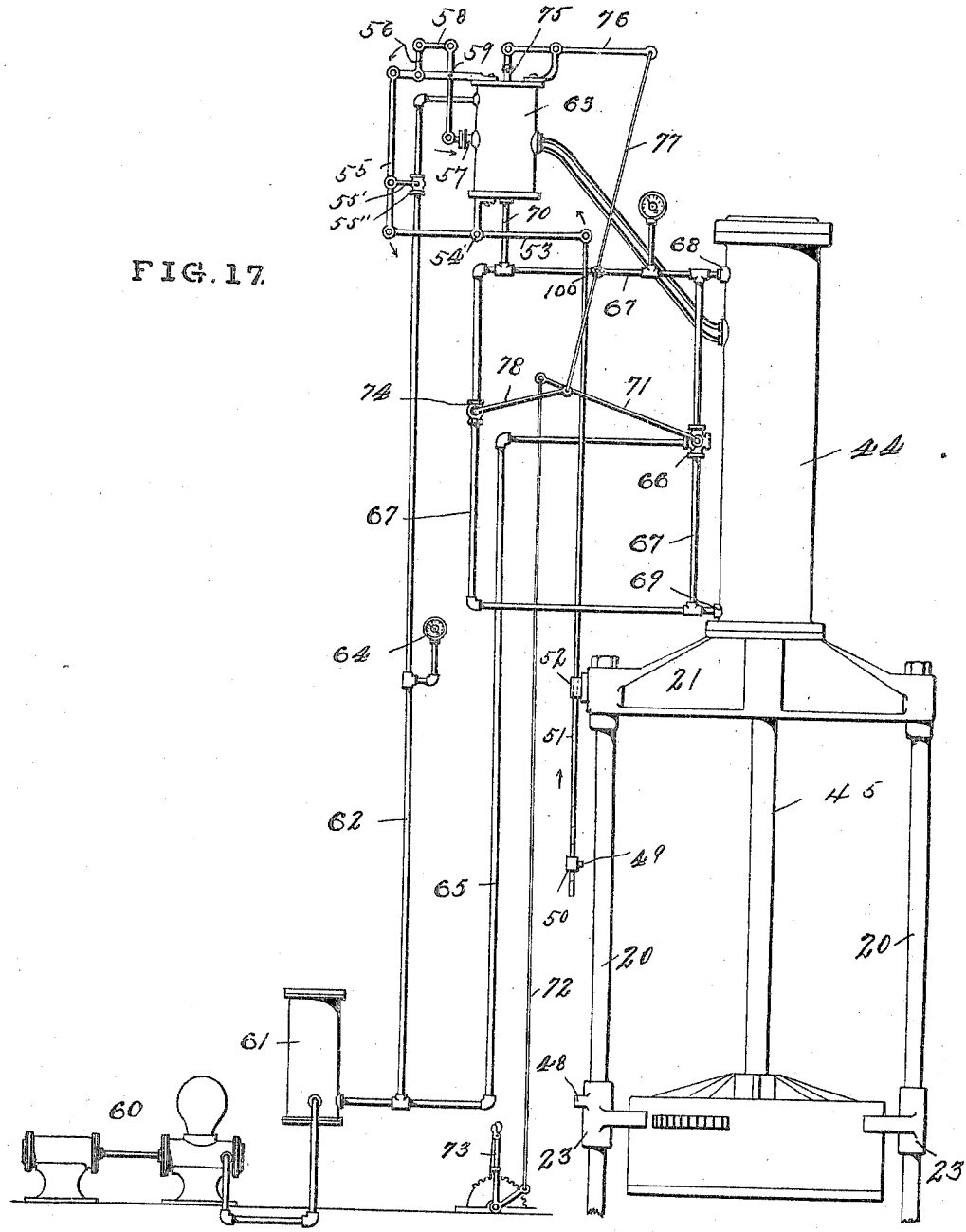

UNITED STATES PATENT OFFICE.

HARRY A. WILLIAMS, OF AKRON, OHIO, ASSIGNOR, BY DIRECT AND MESNE ASSIGNMENTS, OF THREE-TWELFTHS TO SAMUEL J. COLE AND TWO-TWELFTHS TO DAVID A. MESSNER, BOTH OF AKRON, OHIO.

MACHINE FOR MAKING PIPES.

No. 817,209.      Specification of Letters Patent.     Patented April 10, 1906.

Application filed February 24, 1904. Renewed April 21, 1905. Serial No. 256,799.

*To all whom it may concern:*

Be it known that I, HARRY A. WILLIAMS, a citizen of the United States, residing at Akron, in the county of Summit and State of Ohio, have invented certain new and useful Improvements in Machines for Making Pipes, of which the following is a specification.

My invention relates to machines for making clay pipes, and has for its object the provision of an efficient, rapidly-operated, and simple mechanism whereby clay pipes may be formed with despatch and convenience.

Another object of my invention is the construction of mechanism which may be operated with little exertion of manual power.

To attain these ends, I locate the cylinder for providing the motive power below the clay-pipe former, and thus force the clay through the clay cylinder and former and die, and the bell end of the pipe being upward or on top I avoid the necessity of turning the pipe over after it has been formed. This is a decided advantage, as it is undesirable to have the bell end of the pipe resting on the means for carrying it away.

The die and former in forming the pipe are operated by steam from a steam - cylinder located directly below the clay-cylinder, and the water-cylinder for acting in conjunction with the power from the steam-cylinder in forming the pipe is located above the clay-cylinder, thereby obtaining a direct and convenient operation of the mechanism.

My invention consists in the combinations and arrangements of parts hereinafter described and claimed.

Figure 1:
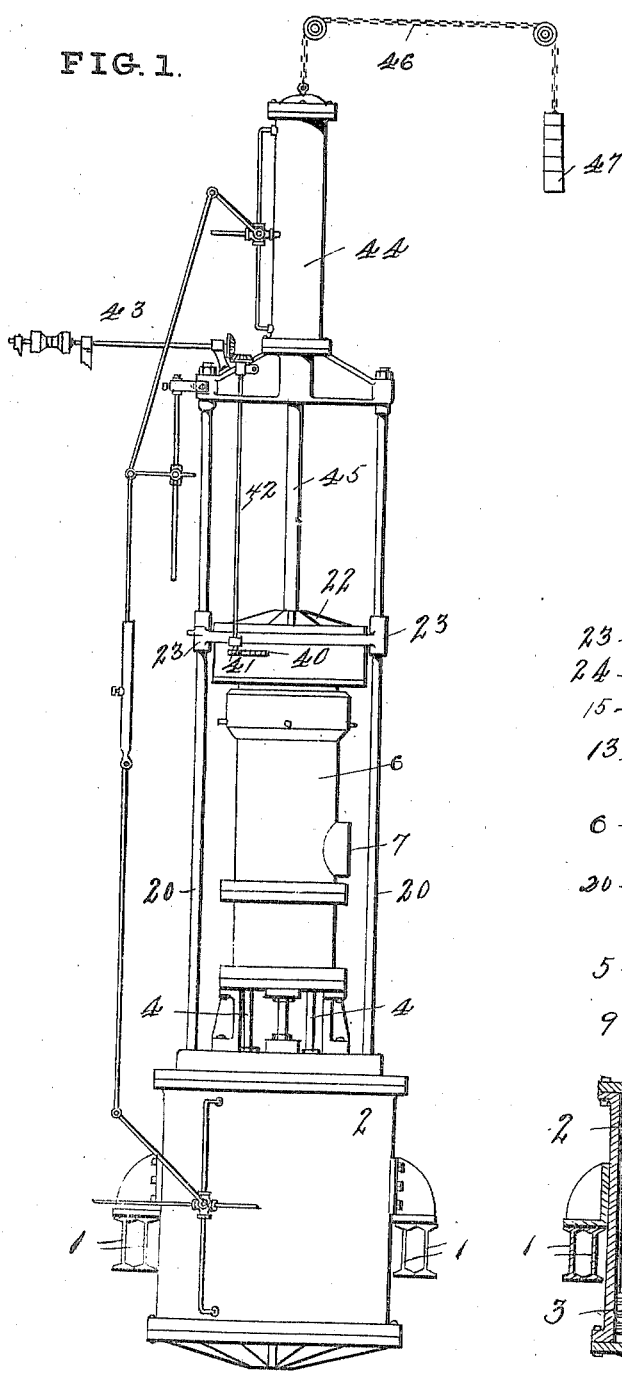
Figure 2:
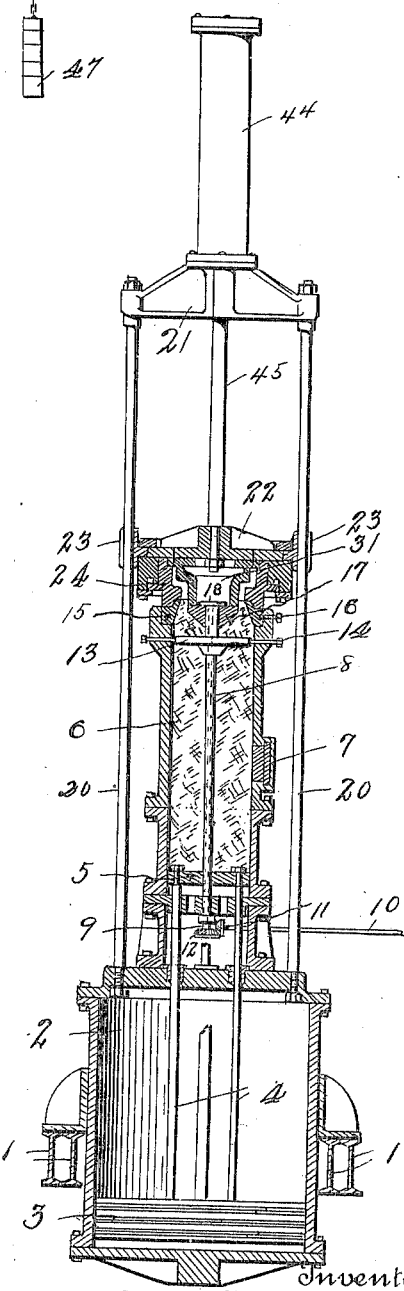
Figure 12:
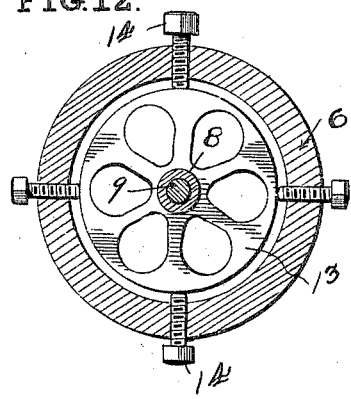
Figure 13:
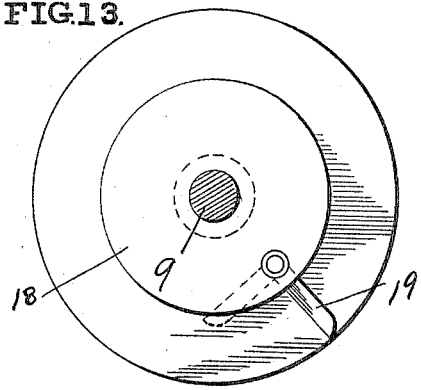
Figure 14:
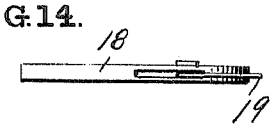
Figure 15:
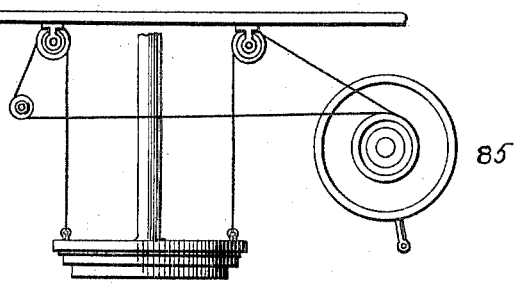
Figure 16:
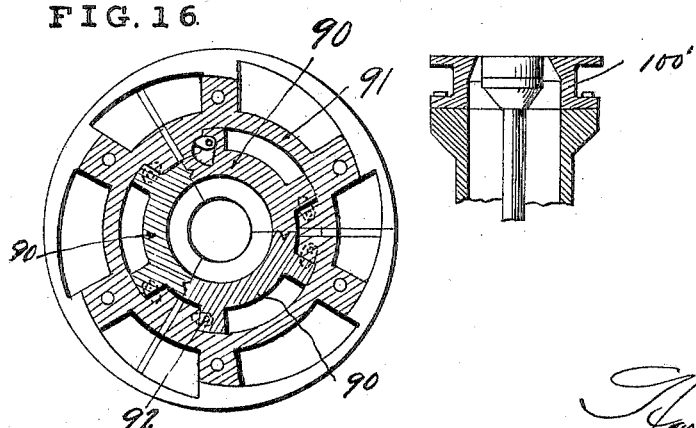

In the accompanying drawings, Figure 1 is an elevation of my device. Fig. 2 is a similar view to Fig. 1, parts being shown in section, with the mud-head down and ready to be raised or lifted to form a pipe of the clay shown in the clay-cylinder. Fig. 3 is an enlarged sectional view showing one-half of the die and former with a section of the pipe formed therein after the mud-head has been raised and the die closed; and Fig. 4 is a similar view of the whole die and former, the die open and the completed pipe in position on the ring - board ready to be carried away. Fig. 5 is a detail of the head to which the former is fastened. Fig. 6 is a detail view of the former. Fig. 7 is a plan view of the cam-ring and expansible die, the die being opened. Fig. 8 is a perspective view of the cam-ring. Fig. 9 is a perspective view of the expansible ring. Fig. 10 is a perspective view of the guide ring or plate having slots therein whereby the die is expanded. Fig. 11 is a plan view of the closed die and cam-ring. Fig. 12 is a cross-sectional view of the mud-cylinder, taken at the line of the obstruction-plate. Fig. 13 is a plan view of the pipe-cutting device, and Fig. 14 is a side view of the cutter. Fig. 15 is a view showing a modified form of mechanism for manipulating the former. Fig. 16 is a modified form of cam-ring and expansible die. Fig. 17 is an enlarged view of the mechanism for controlling the operation of the machine.

In the drawings, 1 1 indicate I - beams suitably supported, and said beams form the sole support for the entire machine; 2, the steam - cylinder for providing motive force for the clay-pipe-forming mechanism; 3, a piston in the steam-cylinder; 4 4, bars rigidly connecting the steam-piston with the mud-head 5; 6, the clay-cylinder, in which the mud-head is located and adapted to vertically reciprocate; 7, a door in the clay-cylinder for feeding clay therein; 8, a hollow shaft extending upwardly through the clay-cylinder; 9, a shaft located within the shaft 8 and adapted to rotate therein; 10, a transverse shaft suitably driven to rotate pinions 11 and 12, whereby the shaft 9 is turned; 13, a perforated adjustable obstruction plate or ring located in the upper end of the clay-cylinder; 14, adjusting - screws bearing on plate 13, the operation of which will be understood on reference to Fig. 12 of the drawings; 15, a reducing-ring located in the upper end of the clay-cylinder; 16, adjusting-screws for said ring; 17, a bell located in the upper end of the clay-cylinder, between which bell and the reducing-ring the clay is forced while a clay pipe is being formed; 18, a plate rigidly attached to shaft 9, adapted to be rotated or turned by said shaft when motion is imparted thereto by pinions 11 and 12; 19, a knife-blade pivoted to plate 18 and adapted to rotate therewith.

Extending from the cylinder 2 are a suitable number of guide-rods 20, connected at the top by brace 21.

22 is a head having guides 23 connected thereto and adapted to travel vertically on said guide-rods 20.

24 designates a cam-ring used in conjunction with the die and provided with three cam-surfaces 24', formed on its interior. Said cam-ring is fastened to the former-head by bolts passing through holes 25 in the cam-ring and holes 26 in the plate or ring 27, which plate is located above the former-head 28 and is connected to the cam-ring with the former-head interposed between them, thus rigidly connecting the ring 27, former-head 28, and cam-ring 24.

29 is the former, having a top flange 30, provided with openings 31 for the passage of air therethrough. In operation of the device when the mud-head forces the clay upwardly air is forced through said holes or openings 31 and also through holes 31' in the former-head.

32 indicates the expansible die as a whole, which consists of three segments 32', each provided with a contact-surface 33, adapted to frictionally contact with the cam-surfaces 24' of the cam-ring, as before described. Said cam or eccentric surfaces 24' at their ends nearest the center of the die, where they bear against the expansible die or projections thereon, are made concentric with the center of the die, as at 33', so that the pressure in forming the bell of the pipe will not have any tendency to rotate the die or cam-ring and force the die open.

The numeral 34 indicates pins or projections conveniently located one in each of the segments 32', which engage slots 35, located in the former-head 28, and act as guides in the movement of the expansible die.

Each of the segments 32' is provided on its lower flange 36 with a projection or pin 37, and each of these pins has engagement in a complementary slot 38 in ring or plate 39. Said slots are located eccentrically to the general center of the die, and as the die is expanded the three segments are opened from the center by the movement of the pins 37, traveling in the eccentric slots 38, said pins moving away from the center of the die.

A rack-bar 40 is attached to the outer periphery of the cam-ring, which, in conjunction with the pinions 41, journaled on vertical shaft 42, is driven by suitable mechanism, as 43, and is adapted (when the die is open) to rotate the cam-ring 24, and thus by means of the cam-surfaces 24', bearing on the contact-points or pieces 33, to close the die.

The water-cylinder 44 is preferably located above and in line with the mud and steam cylinders, and said water-cylinder is provided with a piston-rod 45, having a piston at one end and located in the water-cylinder and having its other end bolted to the former-head, as shown in Fig. 2. Attached to the piston-rod 45 in the water-cylinder is a chain 46, passing over suitable pulleys and having at its end a balance or weight 47, adapted to just counterbalance the weight of the piston-rod, die, and attached moving parts.

On one of the moving or reciprocating parts of the device, preferably one of the guides 23 on the former, I locate a projecting piece 48, which is adapted when the former rises to contact with a projecting portion 49, which may be a set-screw in sleeve 50, which sleeve is thus adjustable on rod 51, and said rod is adapted to slide in bearings 52, fixed to the bar or brace 21. At its upper end rod 51 is loosely connected to lever 53, which is pivoted at 54'. Pivotal connection is formed between levers 54 and 55, and lever 55 is loosely pivoted to lever 56, which has pivotal connection to valve 57 through levers 58 and 59. A valve-lever 55' is also connected to lever 55, which lever controls valve 55" on supply-pipe 62.

A pump 60 supplies water to the receiver 61, which receiver is connected by branch pipe 62 to the distributing-tank 63, a water-gage 64 being located on pipe 62. A second pipe 65 leads from the receiver and is connected by valve 66 to the water-circuit 67, which circuit enters the water-cylinder 44 at points 68 and 69 above and below the piston therein. Said circuit 67 is also connected by pipe 70 to the distributing-tank 63. Valve 66 is controlled by lever 71, which is connected by rod 72 to the pawl and ratchet operating lever 73.

Valve 74 in the water-circuit is a pressure-regulated valve, being controlled from the distributer by piston-rod 75 in the distributer 63, through rocker-arm 76, rod 77, and valve-lever 78.

The operation of the machine is as follows: As shown in Fig. 1, the mud-head is down. The clay-cylinder having been filled with clay through the feed-door, the die and former are brought down on top of the clay-cylinder. The mud-head is then forced up by power from the steam-cylinder, forcing the clay into the die and forming the bell of the pipe 85. At this point the water is admitted to the water-cylinder below the piston at 69 from the tank 63 and pipe 70, valve 74 being in position to pass the water and the pressure being equal through the water-circuit 67, except in the upper portion thereof, (wherein is located check-valve 100,) connected to the water-cylinder at 68. Thus the die and former are permitted to rise up, and at the same time, the steam having been admitted to the steam-cylinder, the clay is forced up and forms the body of the pipe 85, the die and former rising just as fast as the clay is forced upwardly and acting as a means for imposing a resistance to the upward movement of the clay as it is forced upwardly and condensing or compressing the clay while being formed into a pipe. After a desired length of pipe is run out point 48 on the traveling guide 23 contacts with the projection 49 on rod 51, lifting said rod, and through the described mechanism shuts off valve 55″, thus shutting off pressure from the pump through pipe 62, supply-pipe 65 being controlled by valve 66 through manually-operated lever 73. The pipe 85 having reached the extreme position, the revolving knife-blade 19 is operated, and the length of pipe is cut off by said knife at the bottom, separating the pipe from the clay in the clay-cylinder. Water is then admitted to the water-cylinder at 69 by means of valve 66, operated as described, thus raising the die and pipe sufficiently away from the clay-cylinder to place the ring-board 80 underneath the pipe and leaving the board on top of the clay-cylinder, as in Fig. 3. The pipe is then lowered to rest on the board 80, and the die is expanded by means of pins 37 and slots 38, when the cam-ring is revolved, as described, thus relieving the pipe and leaving it free to be carried off. The die is then closed up by a reverse turn of the cam-ring and the die and former dropped down upon the top of the clay-cylinder and the mud-head withdrawn for another charge of clay.

In Fig. 16 I show a modified form of the expansible die and cam-ring connected thereto, there being six cam-surfaces and contact-points. The die-sections 90 are locked to the die-holder 91 by turn-buttons 92, so that in case a different-size die is desired the present die may be quickly removed by turning buttons 92, when the die will drop out of the holder and a different-size die may be replaced.

It will be seen that to release the pipe from the die it is necessary to make the die expanding. This is accomplished in the following manner: On the rod coming down from the water-cylinder is secured a head with guides sliding on the tie-rods to prevent turning. Fastened to this head is the former, which former is made detachable, so as to allow for different sizes of pipes. Below this former is the expansible die, which is shown in the principal views as being in three segments, each segment having a pin projecting upward, which pin enters a slot in the die-holder and keeps the die from rotating when being opened. On the bottom of the die is a flange 36, containing a pin in each section of the die, which pin enters the eccentric slots in the die-ring below. It will thus be seen that by turning the die-ring 38 the three segments of the die will be forced outwardly and apart. These two positions—open and shut—are shown more in detail in Figs. 7 and 11. To turn the die-ring and to hold the sections of the die securely in place while the pipe is being formed, the die is surrounded by the cam-ring 24, the inner surface of which is finished with three eccentric or cam surfaces 24′, which bear against projections 33 on the outside of the expansible die.

As will be seen from an inspection of the drawings, when the cam-ring is turned to the left, as indicated by arrow in Fig. 7, the three sections of the die are forced inward, the adjoining edges of the die being tongued and grooved, so that they are forced securely into place and no undesirable shoulder is left on the inside. The last two inches of these eccentric surfaces, where they bear against the die, are made concentric with the center of the die, so that the pressure in forming the bell will not have any tendency to rotate the die-ring and force the die open.

The cam-ring is rotated to open or close the die by means of a portion of a rack bolted on the outside of the cam-ring. Meshing with it is a pinion carried on a vertical shaft and supported at the lower end of the die-holder in a suitable bearing. This vertical shaft is driven by a pair of bevel-gears supported on the lower part of the water-cylinder, as shown in Fig. 1. The vertical shaft is arranged to slide through one of these bevels with a feather-key, thus allowing the die and former to be raised and lowered. Motion is transmitted to these gears by a pair of clutch-pulleys, as indicated at 43, Fig. 1.

It will sometimes be necessary to change the reducing-ring and bell within the clay-cylinder, this change being made substantially as shown in Fig. 15, where the die is adapted to rest on the reducing-ring, and the ring is tapered or cone-shaped on the interior, so that the die will more readily make a tight joint. In this Fig. 15 the die is shown as of ordinary construction, being controlled by hand-wheel 85 through pulleys and cords or chains, as shown.

The machine is entirely supported upon I-beams, as shown, said beams resting on suitable piers. The machine has suitable brackets bolted to the steam-cylinder, which brackets rest upon the I-beams. The whole machine above this point is self-supporting. It is intended that the operating-levers be concentrated at one point for the operation of the machine, including the steam-cylinder and water-cylinder, as well as the levers controlling the clutches for opening and closing the die and for cutting off the pipe and also for controlling the water-supply.

What I claim, and desire to secure by Letters Patent, is—

1. A clay-receptacle, a plunger therein, a piston connected to said plunger and located in a steam-cylinder; an expansible die and former movable relative to the clay cylinder or receptacle, said die consisting of segments of a cylinder located within a ring, a rack on the ring, and a gear engaging therewith to rotate the ring and close the segments, and suitable guides and supports for said die and former.

2. A clay-receptacle having a reducing-ring in one end, a plunger in the receptacle, a piston connected to said plunger and located in a steam-cylinder; an expansible die and former movable relative to the clay-cylinder or receptacle, said die consisting of segments located within a ring, a rack on the ring and gear adapted to engage therewith to rotate said ring and close the segments, and suitable guides and supports for said die and former.

3. The combination of a clay-receptacle, a plunger therein, with an expansible die consisting of segments located within a ring, said ring and segments adapted to frictionally engage and movable relative to the clay-receptacle, a rack on the ring and a gear-wheel for closing and opening said die.

4. A clay-receptacle, a reducing-ring located therein, a plunger in said receptacle and operated to reciprocate therein, and an expansible die and former movable relative to the clay cylinder or receptacle, said die consisting of segments located within a ring, projections on the segments and cam-surfaces on the ring adapted to engage therewith, a rack on the ring and a gear-wheel engaging therewith, and means connected with the segments for opening the die.

5. A clay-receptacle, a perforated obstruction-plate adjustable therein, a plunger in said receptacle and operating means therefor, an expansible die consisting of a ring, segments therein and means for turning said ring to close said segments and means for opening the die connected to said segments; and a former movable relative to the clay-receptacle.

6. A clay-receptacle, a reducing-plate located therein, a plunger in said receptacle and operated to reciprocate therein, and an adjustable obstruction-plate in said receptacle, combined with an expansible die, said die consisting of segments of a cylinder provided with projections a ring having cam-surfaces inclosing said segments and means for turning said ring.

7. A clay-receptacle, a reducing-plate located therein, a plunger, and an obstruction-plate in said receptacle, combined with an expansible die consisting of a ring provided with cam-surfaces, segments inclosed therein each provided with a projection and means for opening and closing said die.

8. The combination of a clay-receptacle, a plunger therein, with an expansible die, said die consisting of segmental blocks each block having a projection thereon, and a ring surrounding said die having cam-surfaces for engagement with said projections, a rack on said ring and a pinion engaging therewith for rotating said ring to close the die and means connecting said ring and blocks whereby the die is opened by the reverse movement of the ring.

9. The combination with a clay-receptacle, a plunger therein, with an expansible block or die, said die consisting of segments each having a projection thereon, and a ring surrounding said die provided with cam-surfaces adapted to engage with said projections, a rack on said ring, and a suitably-driven pinion for rotating said ring by its engagement with the rack and means connecting said ring and blocks whereby the die is opened by the reverse movement of the ring.

10. An expansible die consisting of segments each having a projection thereon, a ring surrounding said die and provided with cam-surfaces adapted to engage with said projections, a second ring having eccentric connection with said segments and means for rotating said rings to close or open the die.

11. An expansible die consisting of segments each having a projection thereon, a ring surrounding said die and provided with cam-surfaces adapted to engage with said projections, a rack on the ring and a pinion suitably driven, adapted, by its engagement with the rack to close the die.

12. An expansible die consisting of segments each having a projection thereon, a ring surrounding said die and provided with cam-surfaces adapted to engage with said projections, combined with a guide-plate having slots therein, and projections on the segments adapted to travel in said slots.

13. An expansible die consisting of segments each having a projection thereon, a holder surrounding said die and provided with surfaces for engagement with said projections, combined with a guide-plate having slots therein located eccentrically to the center of the die, and projections on the die-segments for engagement with said slots.

14. An expansible die consisting of segments each having a projection thereon, a ring surrounding said die and provided with cam-surfaces adapted to engage said projections, combined with a guide-plate having eccentric slots therein, projections on the segments for engagement with said slots; and a rack on said ring and suitably-driven pinion for rotating said ring by its engagement with the rack.

15. A clay-receptacle having a reducing-ring in one end, a cutter in the receptacle adapted to sever the formed pipe therein, a plunger in the receptacle, a piston connected to said plunger and located in a steam-cylinder, an expansible die and former movable relative to the clay-receptacle, said die consisting of segments located within a ring, a rack on the ring and gear adapted to engage therewith to rotate said ring and close the segments, and suitable guides and supports for said die and former.

16. An expansible die consisting of segments each having a projection thereon, a ring surrounding said die and provided with cam-surfaces adapted to engage with said projections, combined with a guide-plate having eccentric slots therein; projections on the segments for engagement with said slots, and means for rotating the ring for opening or closing the die.

17. An expansible die consisting of segments each having a projection thereon, a ring surrounding said die and provided with cam-surfaces adapted to engage with said projections, a rack on the ring and a pinion for engagement with said rack, combined with a reciprocating head to which the die and former are connected, and means for reciprocating said die and former.

18. In a pipe-making machine the combination of a steam-cylinder and piston therein, a clay-receptacle and plunger therein connected with said piston, an expansible die and former, a shaft extending through the clay-receptacle, a cutter on the shaft and operating means therefor, and means acting as resistance to regulate the movement and compress the clay of the pipe produced by the plunger.

19. A pipe-making machine consisting of a clay-receptacle and a plunger therein, an expansible die and former in the clay-receptacle, a shaft extending through the clay-receptacle, a disk cutter on said shaft, and means for operating said shaft.

20. The combination of a clay-receptacle and plunger therein, means for operating the same, an expansible die movable relatively to the clay-receptacle, said die consisting of segments of a cylinder located within a ring, a rack on the ring, a gear engaging therewith, and a perforated reducing-ring located in the clay-receptacle.

21. A clay-receptacle and plunger therein, means for operating the same, an expansible die movable relatively to the clay-receptacle, said die consisting of segments of a cylinder located within a ring, a rack on the ring, a gear engaging therewith, and a perforated reducing-ring located in the clay-receptacle, acting as a resistance to regulate the movement of the clay in the receptacle.

22. A clay-receptacle and plunger therein, a steam-cylinder and piston therein connected with said plunger, an expansible die consisting of segments of a cylinder located within a ring, a rack on the ring and a gear engaging therewith, and means acting as a resistance to regulate the movement of the clay in the receptacle.

23. A clay-receptacle and plunger therein, a steam-cylinder and piston connected with the plunger, a segmental cylinder and ring inclosing the same, a rack on the ring and a gear engaging therewith, a perforated reducing-ring, means acting as a resistance to regulate the movement of the clay in the receptacle, a shaft in the receptacle, a cutter-disk and cutter on said shaft, and means for operating said shaft.

24. A clay-receptacle, an expansible die and plunger therein, a steam-cylinder and piston to operate the plunger, a water-cylinder and piston therein connected with the die, and means on the die adapted to engage with connections to limit movement of the die.

In testimony whereof I affix my signature in presence of two witnesses.

HARRY A. WILLIAMS.

Witnesses:
   Geo. H. Rempes,
   Josiah Emmett.